United States Patent
Harrison et al.

(10) Patent No.: US 6,653,390 B1
(45) Date of Patent: Nov. 25, 2003

(54) TRIPHENYLMETHANE DYES FOR WATER-BASED COMPOSITIONS

(75) Inventors: Ashleigh Simms Harrison, Huntington, WV (US); Gary Don Ellis, Proctorville, OH (US)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 09/545,418

(22) Filed: Apr. 8, 2000

(51) Int. Cl.$^7$ .............................................. C08K 5/01
(52) U.S. Cl. ................................... 524/486; 524/484
(58) Field of Search ................................. 524/484, 486

(56) References Cited

U.S. PATENT DOCUMENTS

| | | | | |
|---|---|---|---|---|
| 3,439,004 A | 4/1969 | Beckett | ........................ | 260/391 |
| 3,635,745 A | 1/1972 | Rentel et al. | ............ | 106/288 Q |
| 3,671,553 A | 6/1972 | Papenfuss et al. | ........... | 260/392 |
| 3,733,215 A | 5/1973 | Antwerp et al. | ....... | 117/138.8 F |
| 3,925,094 A | 12/1975 | Papenfuss et al. | | |
| 3,941,727 A | * 3/1976 | Timmerman et al. | ........... | 260/8 |
| 4,032,357 A | 6/1977 | Rees et al. | ............... | 106/288 Q |
| 4,061,464 A | 12/1977 | Hahnke et al. | | |
| 4,062,877 A | 12/1977 | Hahnke et al. | | |
| 4,321,207 A | 3/1982 | Cesark | ........................ | 260/391 |
| 4,469,516 A | 9/1984 | Schneider et al. | ............. | 106/23 |
| 4,469,519 A | 9/1984 | Iyengar | ................... | 106/288 Q |
| 4,944,806 A | 7/1990 | Sarangpani et al. | ......... | 106/493 |
| 6,232,392 B1 | * 5/2001 | Warren et al. | ............... | 524/513 |
| 2001/0042492 A1 | 11/2001 | Greene et al. | ............... | 106/410 |

FOREIGN PATENT DOCUMENTS

| | | | |
|---|---|---|---|
| DE | 2128388 | 6/1970 | ............. C08J/1/36 |
| DE | 2354274 | 10/1975 | ........... C09B/67/00 |
| DE | 2757815 | 6/1979 | ........... C09B/67/00 |
| DE | 3045679 | 7/1982 | ........... C09B/67/32 |
| DE | 3405285 | 8/1985 | ........... C09B/11/04 |
| EP | 1103580 | 11/2000 | ........... C09B/67/04 |
| GB | 1356959 | 4/1971 | ........... C09B/67/00 |
| GB | 2096618 | 4/1981 | ............. C08J/3/20 |
| JP | 9217019 | 8/1997 | ......... C09B/67/200 |

OTHER PUBLICATIONS

English European Search Report for EP01123020.
English Abstract for DE3405285.

* cited by examiner

Primary Examiner—James J. Seidleck
Assistant Examiner—U. K Rajguru

(57) ABSTRACT

Novel pigment compositions comprising pigmentary salts and polymers are provided. Pigmentary salts of triphenylmethane dyes are co-precipitated with polyfunctional polymeric acids to form pigment compositions having greatly increased hydrophilicity, dispersability and compatibility with water/polymeric dye vehicles. Processes for forming these pigment compositions are also provided.

5 Claims, No Drawings

TRIPHENYLMETHANE DYES FOR WATER-BASED COMPOSITIONS

FIELD OF THE INVENTION

The present invention relates to organic colorant compositions useful for imparting color. Particularly, the present invention relates to methods for preparing a novel class of triarylmethane dyes and to the dyes prepared.

BACKGROUND OF THE INVENTION

There is currently a growing market for water-based inks in the flexographic printing industry, primarily for package and container printing. There is, moreover, a trend toward the use of water-based inks for all types of printing.

Almost all water-based inks and coatings require a basic pH of about 7 to about 12 for dyes of the inks and coatings to be soluble in an aqueous composition. However, at basic pH, the coloristic properties of most dyes are greatly diminished. For example, blue or purple triphenylmethane dyes with ionizable sulfonic acid groups have been utilized for making water-based inks and coatings. The most commonly used dye of this type is Pigment Blue 61:

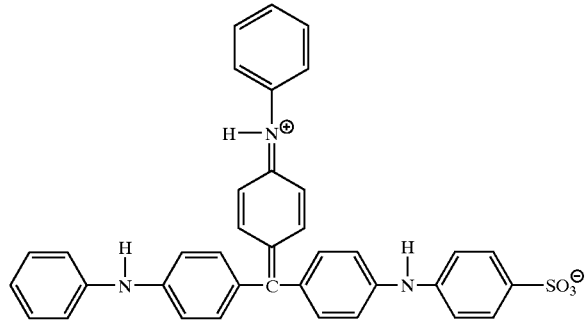

Pigment Blue 61 is a medium shade blue ($\lambda_{max}$=600 nm) which has a very high light absorption per unit of weight and is well suited for use in solvent or oil based inks. However, this pigment is sensitive to changes in pH and, at pH values greater than 9, the resulting salt is reddish-brown instead of blue and is coloristically weak when compared to the blue, acid form of the pigment. Accordingly, because almost all water-based inks and coatings are formulated using polymeric resins that require a pH range of about 7 to about 12 to remain solubilized or emulsified, these ink compositions are often unsuitable for use with triphenylmethane pigments such as Pigment Blue 61.

Among commonly used triphenylmethane pigments are the salts of the phenylpararosanilines (PPR's). The sulfate of triphenylpararosaniline (TPPR) is a pigment used in oil-based printing inks and can be prepared by the pigment flushing process. U.S. Pat. No. 4,944,806 discloses two methods of preparation for the salts (sulfate, chloride, nitrate, and phosphate) of the TPPR molecule. The first method involves dissolving the TPPR in an organic solvent, then mixing the solution with a dilute aqueous solution of the acid and a surfactant using a high shear, turbulent mixer, and isolating the product by filtration. The resulting pigment filtercake is converted to a flushed paste ink by vacuum flushing. The second method disclosed involves crushing the solid TPPR and then grinding it to pigmentary size by the use of a high energy media mill, such as an Attritor, in the presence of dilute aqueous acid and a surfactant. The ground pigmentary salt is then isolated by filtration and converted to a flush paste ink by vacuum flushing.

It would thus be desirable to provide colorant compositions that remain solubilized in water-based ink and coating systems. It would be further desirable if the colorant compositions would also remain coloristically strong when solubilized in water-based ink and coating systems.

U.S. Pat. No. 3,671,553 issued to Papenfuss et. al., is directed to the dyestuffs of the monosulfonic acids of the triphenylmethanes. The patent discloses how to make a "color base sulfate" which is used as an intermediate in the production of the monosulfonated molecule. The 3,671,553 patent does not teach nor suggest a pigmentary form of the "color base sulfate" molecule and in fact specifically teaches that the color base sulfate remain in solution to aid in the preparation of the sulfonic acid form and is not isolated in a solid or pigmentary form.

U.S. Pat. No. 3,439,004 pertains to the triarylmethane dyes and discloses how to make a "dye product" stating that these "dye products" also make excellent pigments. However, this patent is directed specifically at the triaminotriarylurethane compounds which have at least one cyclohexyl sustituent attached to the amino group. It discloses that the dye products, although water-insoluble, have improved solubility in ethyl alcohol and are appropriate for alcohol and polyglycol based inks and coatings.

U.S. Pat. No. 4,321,207 discloses a broad range of triphenylmethane dyes referring to the dyes in their "solid form". However, it does not disclose the use of the dye solids as a pigment and specifically does not refer to the use of the dye solids as a pigment for use in water-based inks or water-based coatings.

U.S. Pat. No. 3,671,553, issued to Papenfuss et al., is directed to the dyestuffs of monosulfonic acids of the triphenylmethanes. This patent discloses how to make a "color base sulfate" that is used as an intermediate in the production of the monosulfonated molecule. The 3,671,553 patent specifically teaches that the color base sulfate remains in solution to aid in the preparation of the sulfonic acid form and is not isolated in a solid or pigmentary form.

U.S. Pat. No. 3,439,004 pertains to triarylmethane dyes and discloses how to make a "dye product" stating that these "dye products" also make excellent pigments. This patent, however, is directed specifically at triaminotriarylurethane compounds having at least one cyclohexyl substituent attached to the amino group. It also does not disclose the use of these dyes in water-based ink systems or water-based coatings.

Japanese Patent No. JP 9217019 discloses a method for producing an aqueous pigment dispersion comprising dispersing coarsely ground pigment with an acrylic resin alkali salt in an aqueous solution. In this method, the pigment is never solubilized in the aqueous solution but instead the resin is associated with the pigment surface and serves as a dispersent for the pigment.

SUMMARY OF THE INVENTION

The present invention provides novel colorant compositions useful in water-based ink and coating systems. The novel colorant compositions include pigmentary salts and water soluble or dispersible polymers in which the polymer is present as inclusions in the pigment particles. The term "polymer" as used herein also refers to oligomers and resins. The pigmentary salt may be obtained from saltable colorant dyes suitable for inks and coatings. Preferably the pigmentary salt is formed from a triarylmethane dye, especially triphenylmethane or one of its derivatives. The polymer can be any water soluble or dispersible polymer or resin that aids in solubilizing or dispersing the pigmentary salt in aqueous compositions. Preferably the polymer or resin has acid functionality.

The present invention also provides a process for producing the novel colorant composition. The method includes converting a free unsalted dye to the corresponding pigmentary salt by dissolving the dye in aqueous acid at elevated temperatures, adding the water-soluble or water-dispersible polymer or resin, and then co-precipitating the pigmentary salt with the polymer. The precipitated particles contain mixtures of the resin and the pigment. Colorant compositions thus prepared have greatly increased hydrophilicity, dispersibility, and compatibility with aqueous polymeric ink vehicles.

DETAILED DESCRIPTION

The present invention provides novel colorant compositions that include a pigmentary salt and a water soluble or dispersible polymer or polymeric or oligomeric resin in which the polymer is present as inclusions in the pigment particles. A process for making the novel pigment compositions is also provided. The process includes steps of converting a dye to a pigmentary salt and co-precipitating the salt with a water soluble or dispersible polymer.

In one embodiment, the novel colorant composition of the present invention comprise the salt of a dye, preferably the salt of a triphenylmethane dye having the general formula:

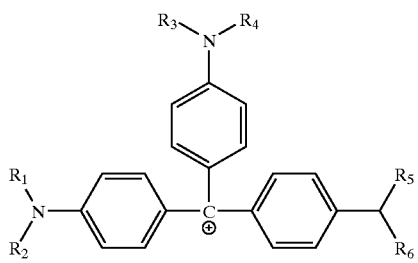
(I)

wherein $R_1$, $R_2$, $R_3$, $R_4$, and $R_5$ each independently is H, substituted or unsubstituted alkyl group or phenyl or substituted phenyl. The alkyl group will preferably have 1 to 12 carbon atoms. Preferably, the substituted phenyl has the general formula:

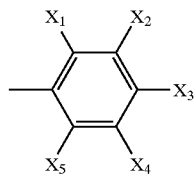

wherein $X_1$, $X_2$, $X_3$, $X_4$, and $X_5$ each independently is any substituent, preferably H, F, Cl, Br, I, $CH_3CH_2O$—, $CH_3O$—, $NO_2$, or substituted or unsubstituted alkyl including —$CH_3$ and —$CH_2CH_3$.

In a preferred embodiment, the triphenylmethane dye had a formula selected from the formulas II, III, and IV:

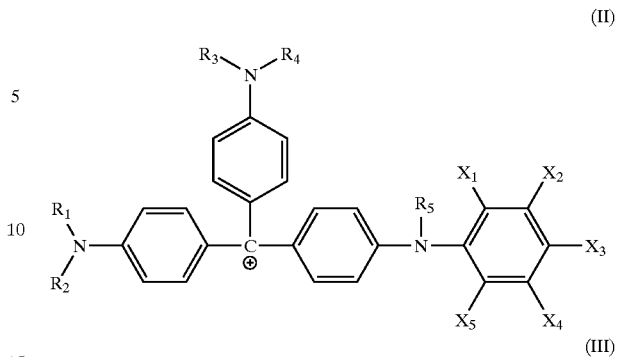
(II)

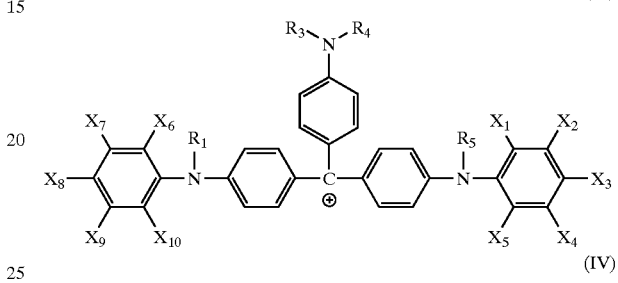
(III)

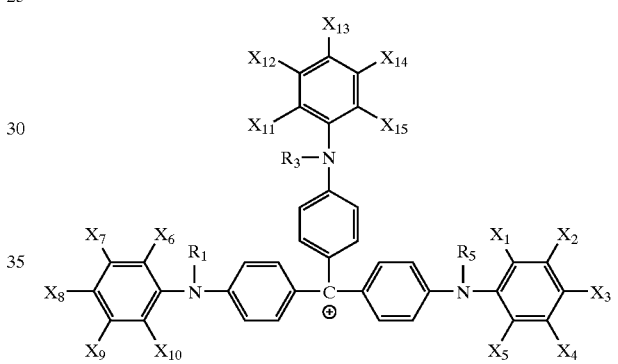
(IV)

wherein $R_1$, $R_2$, $R_3$, $R_4$, and $R_5$ each independently is H, any substituted or unsubstituted alkyl, phenyl or substituted phenyl and $X_1$–$X_{15}$ each independently is any substituent. Preferably, the alkyl has 1 to 12 carbons. Preferably $X_1$–$X_{15}$ each independently is H, F, Cl, Br, I, $CH_3O$—, $CH_3CH_2O$—, and $NO_2$, and any branched or linear alkyl including —$CH_3$ and —$CH_2CH_3$.

The novel colorant composition of the present invention also includes a water soluble or dispersible polymer. Preferably, the polymer is anionic and, more preferably, has acid functionality. Polymers with acid functionality are well known in the art and are commonly used as binders in water-based inks and coatings. In a preferred embodiment, the polymer has acid functionality that includes carboxylic acid groups. In a most preferred embodiment, the polymers are poly(styrene-acrylic acid) copolymers. Preferably, the poly(styrene-acrylic acid) has a styrene to acrylic acid monomer mole ratio of from about 4:1 to about 1:4. More preferably, the monomer mole ratio is from about 2:1 to about 1:2. It will be appreciated that the poly(styrene-acrylic acid) polymer may include other comonomers along with styrene and acrylic acid.

The present invention also provides a process for making the novel colorant compositions. Initially, a triarylmethane dye is converted to pigmentary salts in aqueous acid, resulting in a solution in which the dye is solubilized as the pigmentary salt. A polymer is then dispersed in the pigment salt solution and a pigment-polymer composition is formed by coprecipitating pigmentary salt and polymer from solution.

In one embodiment, a triarylmethane dye is converted to a pigmentary salt by heating the dye in an aqueous acid solution. In a first step of this process, at least one solid dye is finally ground. Preferably, the dye is finely ground to about less than or equal to 20 mesh. The dye used is preferably a triphenylmethane dye having the general formula of structure I as previously defined.

In a preferred embodiment, the dye is suspended in an aqueous acid solution, in which the aqueous acid is present in a molar excess of at least 2:1 over the dye or dyes. The acid can be any aqueous acid such as, but not limited to, phosphoric acid, sulfuric acid, HBr, HCl, HF, HI, and R—$CO_2$H, where R is selected from lower molecular weight alkyl ($C_1$ to $C_5$) or phenyl moieties. Preferably, the aqueous acid is phosphoric acid, sulfuric acid, acetic acid, propionic acid, or acrylic acid, as these acids may produce the best coloristic properties of the pigment composition. The concentration of the aqueous acid can be from about 5% by weight to 99% by weight, and preferably from about 5% to 50% by weight. If the acid is sulfuric acid, the concentration is 5% to 95% by weight. Dissolution of the dye in neat or concentrated sulfuric acid may result in sulfonation of the dye.

The dyes may be converted to the pigmentary salts by heating the dye suspension in the aqueous acid. In a preferred embodiment, the dye suspension is heated to a temperature of at least or greater than about 100° C. with constant stirring As the solution is heated, the dye may form a sticky coating at the surface. This can be prevented by either increasing the rate of stirring or agitation, and/or heating the solution rapidly. While the dye may be slightly soluble in an aqueous solution, salting the dye increases the solubility. The dye solution should be kept at elevated temperature until all the dye is solubilized as the pigmentary salt.

Next, the polymer is dissolved or dispersed in the solution of the pigmentary salt. The polymer may be added as an aqueous solution, as a finely divided powder, or as small pellets; preferably the polymer is added as an aqueous solution. The amount of polymer added is typically from about 2% to about 25% by weight of the pigmentary salt. Preferably the amount of polymer is from about 5% to about 10% by weight of the pigmentary salt. The polymer may be any water soluble or dispersible polymer, oligomer or resin. Preferably, the polymer will be anionic, more preferably it will be a polymer having acid functionality and most preferred, it will comprise multiple carboxylic acid groups. In a preferred embodiment, a poly(styrene-acrylic acid) copolymer is used. Preferably, the copolymer will have a styrene to acrylic acid monomer mole ratio of from about 4:1 to about 1:4. More preferably, the monomer mole ratio will be from about 2:1 to about 1:2. Additional comonomers may also be present in the poly(styrene-acrylic acid) polymer. In a preferred embodiment, the aqueous polymer solution contains an organic amine such as, but not limited to, methylamine, dimethylamine, trimethylamine, mono-, di-, or tri-ethyl amine. More preferably, the organic amine is volatile such that it will evaporate during formation of the colorant composition and, if any amine does remain, during the printing or coating process.

In a preferred embodiment, the aqueous polymer solution contains an organic amine such as, but not limited to, methylamine, dimethylamine, trimethylamine, mono-, di- or tri-ethylamine. More preferably, the organic amine is volatile such that it will evaporate during formation of the colorant composition and, if any amine does remain, during the printing or coating process.

After dispersion of the polymer in the pigmentary salt solution, the temperature of the resulting mixture is cooled to less than about 60° C. For example, the temperature may be adjusted by addition of cold water or ice, placing the vessel containing the mixture on ice or in cold water, or using a heat exchanger.

The colorant composition of the present invention is then obtained by co-precipitating out the pigmentary salts and the polymer. Coprecipitation of the pigmentary salts and the polymer results in a relatively homogenous composition in which the polymer is at least partially present as inclusions in the pigment particles. In one embodiment, the pH of the cooled mixture is increased such that the pigmentary salt and polymer will coprecipitate. Preferably, the pH is adjusted to about pH 3 to about pH 11 by the addition of base, preferably aqueous ammonia. More preferably, the pH will be adjusted to between about pH 4.0 to about pH 6.0. As the pH of the mixture is raised to neutral or basic pH, the colorant composition is formed as a coprecipitate. The resulting slurry is then filtered and washed with an aqueous solution, preferably water, to obtain the solid pigmentary composition. The colorant composition may be used immediately as a filter-cake or dried and used as a dry, easily-dispersible pigment.

Colorant compositions prepared by the process of the present invention have greatly increased hydrophilicity and compatibility with aqueous ink vehicles, as well as increased dispersibility in aqueous inks. While not wishing to be bound by theory, it is believed that the superior properties of the pigment compositions prepared as described herein in water-based applications are due to the inclusion of the polymer within the pigment particles.

The foregoing and other aspects of the invention may be better understood in connection with the following examples, which are presented for purposes of illustration and not by way of limitation. All the parts and percentages are by weight unless stated otherwise.

EXAMPLE 1

SURFYNOL® 104 (0.2 grams; a pigment wetting agent available from Air Products, Inc., Allentown, Pa.) was added to a mixture of 500 ml of water and 115 grams of 85% phosphoric acid in a beaker. The resulting solution was heated to 50° C. To the dilute acid solution was added 61 grams of a finely ground ($\leq 20$ mesh) triphenylpararosaniline (80–98%), with 2–20% diphenylpararosaniline and trace amounts of monopararosaniline. The mixture was heated to 100° C. as rapidly as possible, while stirring vigorously, and was held at temperature for 30 minutes until all of the dye had been dissolved and was converted to the phosphate salt. Once all of the material was in solution, 6.1 grams of a previously prepared solution containing 43% of the styrene-acrylic acid polymer SCX-686# (S. C. Johnson, Racine, Wis.) in aqueous ammonia was added. 2000 ml of cold (25° C.) water was added to the mixture and the pH was adjusted to 5.0 with 28% aqua ammonia. The mixture was then filtered and washed with three liters of warm ($\approx 35$–40° C.) water. The washed filtercake was then dried at 75° C. for 24 hours. The recovered yield was 59 grams.

EXAMPLE 2

SURFYNOL® 104 (0.2 grams) was added to a mixture of 500 ml of water and 101.5 grams of 96.5% sulfuric acid in a beaker. The resulting solution was heated to 50° C. To the dilute acid solution was added 61 grams of finely ground ($\leq 20$ mesh) triphenylpararosaniline (80–98%), with 2–20% diphenylpararosaniline and trace amounts of monopararosaniline. The mixture was heated to 100° C. as rapidly as possible, while stirring vigorously, and was held at temperature for 30 minutes until all of the dye had been dissolved and was converted to the sulfate salt. Once all of the material was in solution, 6.1 grams of a previously prepared solution containing 43% of the styrene-acrylic acid polymer SCX-686™ (S. C. Johnson, Racine, Wis.) in aqueous ammonia, was added. 2000 ml of cold (25° C.) water was added to the mixture and the pH was adjusted to 5.0 with 28% aqua ammonia. The mixture was then filtered and washed with three liters of warm (≈35–40 ° C.) water. The washed filtercake was then dried at 75° C. for 24 hours.

EXAMPLE 3

SURFYNOL® 104 (0.2 grams) was added to a mixture of 500 ml of water and 180.9 grams of 99.5% acetic acid. The resulting solution was heated to 50° C. To the dilute acid solution was added 61 grams of finely ground (≦20 mesh) triphenylpararosaniline (80–98%), with 2–20% diphenylpararosaniline and trace amounts of monopararosaniline. The mixture was heated to 100° C. as rapidly as possible, while stirring vigorously, and was held at temperature for 30 minutes until all of the dye had been dissolved and was converted to the acetate salt. Once all of the material was in solution, 6.1 grams of a previously prepared solution containing 43% of the styrene-acrylic acid polymer SCX-686™ (S. C. Johnson, Racine, Wis.) in aqueous ammonia, was added. 2000 ml of cold (25° C.) water was added to the mixture and the pH was adjusted to 5.0 with 28% aqua ammonia. The mixture was then filtered and washed with three liters of warm (≈35–40° C.) water. The washed filtercake was then dried at 75° C. for 24 hours.

EXAMPLE 4

SURFYNOL® 104 (0.2 grams) was added to a mixture of 500 ml of water and 115 grams of 85% phosphoric acid in a beaker. The resulting mixture was heated to 50° C. To the dilute acid solution was added 61 grams of the finely ground (≦20 mesh) tris-(para dodecyl) homologue of Solvent Blue 23:

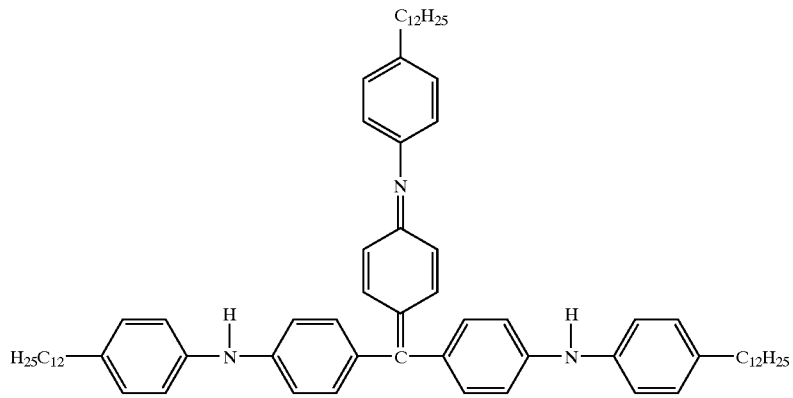

The mixture was heated to 100° C. as rapidly as possible, while stirring vigorously, and was held at temperature for 30 minutes until all of the dye had been dissolved and was converted to the phosphate salt. Once all of the material was in solution, 6.1 grams of a previously prepared solution containing 43% of the styrene-acrylic acid polymer SCX-686™ (S. C. Johnson, Racine, Wis.) in aqueous ammonia, was added. 2000 ml of cold (25° C.) water was added to the mixture and the pH was adjusted to 9.0 with 28% aqua ammonia. The mixture was then filtered and washed with three liters of warm (≈35–40° C.) water. The washed filtercake was then dried at 75° C. for 24 hours. The pigment produced was a very greenish shade of blue.

EXAMPLE 5

SURFYNOL® 104 (0.2 grams) was added to a mixture of 500 ml of water and 115 grams of 85% phosphoric acid in a beaker. The resulting solution was heated to 50° C. To the dilute acid solution was added 61 grams of finely ground (≦20 mesh) N-methyl homologue of Solvent Blue 23:

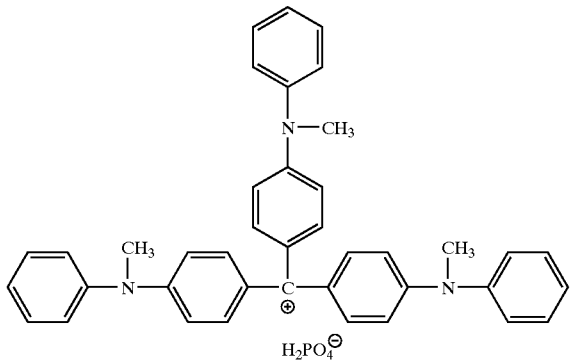

The mixture was heated to 100° C. as rapidly as possible, while stirring vigorously, and was held at temperature for 30 minutes until all of the dye had been dissolved and was converted to the phosphate salt. Once all of the material was in solution, 6.1 grams of a previously prepared solution containing 43% of the styrene-acrylic acid polymer SCX-686™ (S. C. Johnson, Racine, Wis.) in aqueous ammonia, was added. 2000 ml of cold (25° C.) water was added to the mixture and the pH adjusted to 9.0 with 28% aqua ammonia. The mixture was then filtered and washed with three liters of warm (≈35–40° C.) water. The washed filtercake was then dried at 75° C. for 24 hours.

EXAMPLE 6

A resin solution suitable as a grinding or dispersing vehicle was prepared by adding to a vessel 43 parts of water, 14 parts of 28% aqueous ammonia, and 43 parts of the styrene acrylic acid copolymer SCX-686™ (S. C. Johnson), and then stirring, using a high speed disperser, until the resin was fully dissolved, usually ten to twenty minutes.

The pigment dispersion was prepared by combining 23 parts of the triphenylmethane dye/pigment, 48 parts of the grinding vehicle, 28 parts of water, and 1 part of defoamer (Air Products SURFYNOL® 420™). The pigment was predispersed in a high speed disperser (Cowles type) for ten minutes and then transferred to a one-liter shaker mill containing 500 grams of 4 mm stainless steel shot. The mill was secured to a standard paint shaker (Red Devil Equipment Company) and shaken at 750 cycles per minute for twenty-five minutes. The mill was allowed to cool for ten minutes and then the twenty-five minute shake was then repeated resulting in the pigment dispersion.

The final ink was prepared by mixing 42 parts of the pigment dispersion, 21 parts of SCX-2160™ (S. C. Johnson), 36.7 parts of water, and 0.3 parts of SURFYNOL® 420™ (Air Products). The mixture was stirred for ten minutes to insure that it was well blended.

This ink may be used "as is" or may be further reduced with a white ink base to print pastel tones.

EXAMPLE 7

A mixture of 50 parts of JONCRYL® (S. C. Johnson) 99 acrylic solution polymer, 34.8 parts of water, 0.2 parts of defoamer (SURFYNOL® 420™ Air Products), and 15 parts pigment was prepared. The pigment was dispersed using a high speed disperser until the mixture appeared smooth. It was then transferred to a cooled media mill (Drais horizontal mill) and ground for 30 minutes. A final filtration through a 20 mesh screen to separate the grinding media fielded an ink ready for use.

The foregoing discussion discloses and describes merely exemplary embodiments of the present invention. One skilled in the art will readily recognize from such discussion, and from the accompanying claims, that various changes, modifications and variations can be made without departing from the spirit and scope of the invention as defined in the following claims.

We claim:

1. A composition comprising an ink containing pigment particles comprising a coprecipitate of at least one salt of a dye and a water-dispersible or water-soluble, acid functional polymer.

2. The composition of claim 1, wherein the dye is a triphenylmethane dye.

3. The composition of claim 2, wherein the triphenylmethane dye comprises triphenylpararosaniline.

4. The composition of claim 1, wherein the acid-functional polymer is a styrene-acrylic acid copolymer.

5. The composition of claim 4, wherein the styrene-acrylic acid copolymer comprises styrene and acrylic monomer units in a mole ratio of from about 1:4 to about 4:1.

* * * * *